(12) United States Patent
Maeda et al.

(10) Patent No.: US 11,097,724 B2
(45) Date of Patent: Aug. 24, 2021

(54) APPARATUS AND SYSTEM FOR CONTROLLING TRAVEL OF VEHICLE

(71) Applicant: DENSO CORPORATION, Kariya (JP)

(72) Inventors: Yu Maeda, Nisshin (JP); Shunya Kumano, Nisshin (JP); Masaya Okada, Nisshin (JP); Takaharu Oguri, Kariya (JP); Keiji Matsuoka, Kariya (JP)

(73) Assignee: DENSO CORPORATION, Kariya (JP)

( * ) Notice: Subject to any disclaimer, the term of this patent is extended or adjusted under 35 U.S.C. 154(b) by 312 days.

(21) Appl. No.: 16/233,585

(22) Filed: Dec. 27, 2018

(65) Prior Publication Data
US 2019/0202450 A1 Jul. 4, 2019

(30) Foreign Application Priority Data
Dec. 28, 2017 (JP) .............................. JP2017-252777

(51) Int. Cl.
| | |
|---|---|
| *B60W 30/09* | (2012.01) |
| *B60W 30/095* | (2012.01) |
| *G06K 9/00* | (2006.01) |
| *G08G 1/16* | (2006.01) |

(52) U.S. Cl.
CPC ........ *B60W 30/09* (2013.01); *B60W 30/0956* (2013.01); *G06K 9/00805* (2013.01); *G08G 1/166* (2013.01); *B60W 2554/00* (2020.02)

(58) Field of Classification Search
CPC ... B60W 30/09; B60W 30/0956; G08G 1/166
See application file for complete search history.

(56) References Cited

U.S. PATENT DOCUMENTS

| | | | |
|---|---|---|---|
| 10,272,910 B2 * | 4/2019 | Bonarens | B60W 30/09 |
| 2004/0090117 A1 * | 5/2004 | Dudeck | B60W 10/18 |
| | | | 303/191 |
| 2005/0125155 A1 | 6/2005 | Kudo | |
| 2010/0082251 A1 * | 4/2010 | Kogure | G08G 1/165 |
| | | | 701/301 |
| 2011/0187515 A1 | 8/2011 | Saito et al. | |
| 2012/0022716 A1 | 1/2012 | Kitahama et al. | |
| 2013/0218467 A1 | 8/2013 | Ogawa et al. | |

(Continued)

FOREIGN PATENT DOCUMENTS

| | | |
|---|---|---|
| JP | H08-263794 A | 10/1996 |
| JP | H11-039598 A | 2/1999 |

(Continued)

*Primary Examiner* — Peter D Nolan
*Assistant Examiner* — Mikko Okechukwu Obioha
(74) *Attorney, Agent, or Firm* — Maschoff Brennan

(57) ABSTRACT

In an apparatus for controlling travel of an own vehicle which is a vehicle carrying the apparatus, an information acquirer is configured to acquire information regarding a target around the own vehicle from a target detector. A controller is configured to, if determining, using the target information acquired by the information acquirer, that if travel of the own vehicle is continued in accordance with a collision avoidance trajectory determined to avoid a collision with an object located on a roadway ahead of the own vehicle, the own vehicle is likely to collide with the object or another object, change a setting of a driving state of the own vehicle so as to avoid or reduce a likelihood of the collision.

18 Claims, 8 Drawing Sheets

(56) References Cited

U.S. PATENT DOCUMENTS

| | | | |
|---|---|---|---|
| 2014/0200801 A1 | 7/2014 | Tsuruta et al. | |
| 2015/0032290 A1 | 1/2015 | Kitahama et al. | |
| 2015/0224988 A1* | 8/2015 | Buerkle | B60W 30/0956 701/45 |
| 2016/0176397 A1* | 6/2016 | Prokhorov | B60W 30/09 701/25 |
| 2017/0183004 A1* | 6/2017 | Bonarens | B60W 30/09 |
| 2019/0088133 A1* | 3/2019 | Alieiev | G08G 1/161 |

FOREIGN PATENT DOCUMENTS

| | | |
|---|---|---|
| JP | 2000-305625 A | 11/2000 |
| JP | 2006-154967 A | 6/2006 |
| JP | 2010-105553 A | 5/2010 |
| JP | 2011-186878 A | 9/2011 |
| JP | 2012-173786 A | 9/2012 |
| JP | 2013-186767 A | 9/2013 |
| JP | 2014-232508 A | 12/2014 |
| JP | 2015-057688 A | 3/2015 |
| JP | 2015-232866 A | 12/2015 |
| JP | 2016-149110 | 8/2016 |
| JP | 2016-167188 A | 9/2016 |

* cited by examiner

APPARATUS AND SYSTEM FOR CONTROLLING TRAVEL OF VEHICLE

CROSS-REFERENCE TO RELATED APPLICATION

This application is based on and claims the benefit of priority from earlier Japanese Patent Application No. 2017-252777 filed on Dec. 28, 2017, the description of which is incorporated herein by reference.

BACKGROUND

Technical Field

This disclosure relates to a technique for controlling travel of a vehicle in a situation where the vehicle is likely to collide with an object.

Related Art

A vehicle control apparatus disclosed in, for example, JP-A-2010-70069, is configured to, in a case where there are collision risks on both left and right sides of a lane ahead of an own vehicle that is a vehicle carrying the apparatus, change a control threshold for the risk on a respective one of the left and right sides of the lane in response to a danger measure of the risk, and determine a route with less danger risk, thereby assisting in continuing travel of the own vehicle.

However, the above technique is directed to keeping the own vehicle travelling while avoiding the collision risks on both sides of the lane. The above technique, however, does not consider actions to be taken in a case where the vehicle can not avoid the risk on at least one of the left and right sides of the lane and is thus likely to collide with the object.

In view of the above, it is desired to have a technique for avoiding a collision that may occur after taking actions to avoid a collision with an object.

SUMMARY

A first aspect of the disclosure provides an apparatus for controlling travel of an own vehicle. The own vehicle is a vehicle carrying the apparatus. In the apparatus, an information acquirer is configured to acquire information regarding a target around the own vehicle from a target detector. A controller is configured to, if determining, using the target information acquired by the information acquirer, that if travel of the own vehicle is continued in accordance with a collision avoidance trajectory determined to avoid a collision with an object located on a roadway ahead of the own vehicle, the own vehicle is likely to collide with the object or another object, change a setting of a driving state of the own vehicle so as to avoid or reduce a likelihood of the collision.

This configuration of the first aspect can avoid a collision that is likely to occur after taking an action to avoid a collision with an object.

A second aspect of the disclosure provides a method for controlling travel of an own vehicle, the own vehicle being a vehicle carrying the apparatus, the method including: acquiring information regarding a target around the own vehicle from a target detector; and changing a setting of a driving state of the own vehicle so as to avoid or reduce a likelihood of a collision with a front object located on a roadway ahead of the own vehicle or another object if it is determined, based on the target information acquired by the information acquirer, that if travel of the own vehicle is continued in accordance with a collision avoidance trajectory determined to avoid a collision with the front object, the own vehicle is likely to collide with the front object or the other object.

This configuration of the second aspect can avoid a collision that is likely to occur after taking an action to avoid a collision with an object.

It is also possible to implement a computer program which enables a computer to execute the method. This program can be provided by being stored in a computer readable recording medium. Thus, according to the present disclosure, it is also possible to provide the recording medium on which the program is recorded.

DESCRIPTION OF SPECIFIC EMBODIMENTS

Embodiments of the present disclosure now will be described more fully hereinafter with reference to the accompanying drawings, in which embodiments of the disclosure are shown.

First Embodiment

Figure 1:
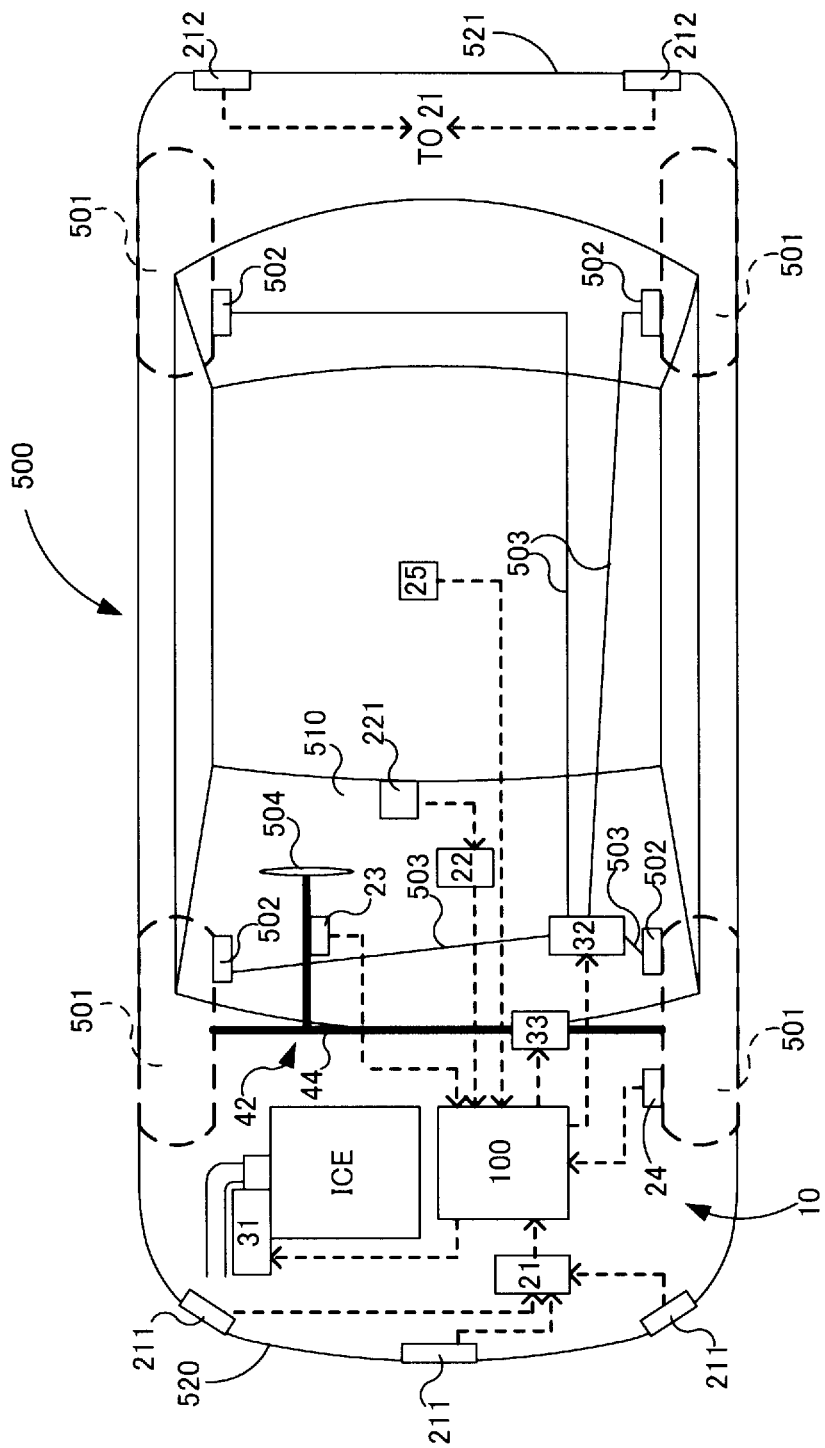
FIG. 1 is a schematic diagram of an own vehicle carrying a travel control apparatus in accordance with a first embodiment of the present disclosure.

As shown in FIG. 1, the travel control apparatus 100 in accordance with a first embodiment of the present disclosure is mounted on a vehicle 500. The vehicle carrying the travel control apparatus 100 is also referred to as an own vehicle. The travel control apparatus 100 may include at least a controller and an information acquirer. A travel control system 10 includes not only the travel control apparatus 100, but also a radar ECU 21, a camera ECU 22, a rotation angle sensor 23, a wheel speed sensor 24, a yaw rate sensor 25, a throttle actuation unit 31, a braking assistance unit 32, and a steering assistance unit 33. The vehicle 500 includes an internal-combustion engine ICE, wheels 501, braking devices 502, brake lines 503, a steering wheel 504, a front windshield 510, a front bumper 520, and a rear bumper 521. The radar ECU 21 is connected to front millimeter-wave radars 211 and rear millimeter-wave radars 212 that emit radio waves and detect reflected waves from objects, and using the reflected waves acquired by the millimeter-wave radars 211, 212, generates and outputs a detection signal representing targets by reflection points. The camera ECU 22 is connected to a monocular forward-facing camera 221, and using images acquired from the forward-facing camera 221 and prepared shape patterns of targets, generates and outputs a detection signal representing a target by images. Each of these ECUs is a microprocessor including a processor, a storage and an interface circuit. The radar ECU 21, the millimeter-wave radars 211, 212, and the camera ECU 22, the forward-facing camera 221 correspond to a target detector 20. In addition to the millimeter-wave radars 211, 212, a laser radar (LIDAR) and an ultrasonic detector that emits sound waves and detect their reflected waves may be included in the target detector. Imagers that capture images of objects may include not only the forward-facing camera 221, but also a stereo camera or multiple cameras formed of two or more cameras.

In the vehicle 500, the internal-combustion engine (ICE) includes the throttle actuation unit 31 that actuates a throttle valve to adjust an amount of intake air and control outputs of the internal-combustion engine ICE. In a case where the internal-combustion engine ICE is a diesel engine with a fixed amount of intake air, a fuel injector actuation unit, instead of the throttle actuation unit 31, is used to control a fuel injection quantity injected by the fuel injector. In such a case, an electrical motor, instead of the internal-combustion engine ICE, may be used, where instead of the throttle actuation unit 31, an output controller including an inverter and a converter may be used. The throttle actuation unit 31 is included in a vehicle control executor 30 that performs acceleration or deceleration of the vehicle speed.

The braking device 502 is provided on each wheel 501. The braking device 502 may be a disc brake or a drum brake, and generates a braking force in response to brake fluid pressure supplied via the brake lines 503 in response to brake pedal actuation by the driver of the own vehicle to perform braking of the wheel 501, thereby performing braking of the vehicle 500. Each brake line 503 includes a brake piston to generate brake fluid pressure in response to the brake pedal actuation, and a brake fluid line. The brake line 503 may be a control signal line, in place of the brake fluid line, to activate an actuator provided in each braking device 502.

The steering wheel 504 is connected to front wheels 501 via the steering device 42 including a steering rod, a steering mechanism, and a turn shaft 44.

Figure 2:
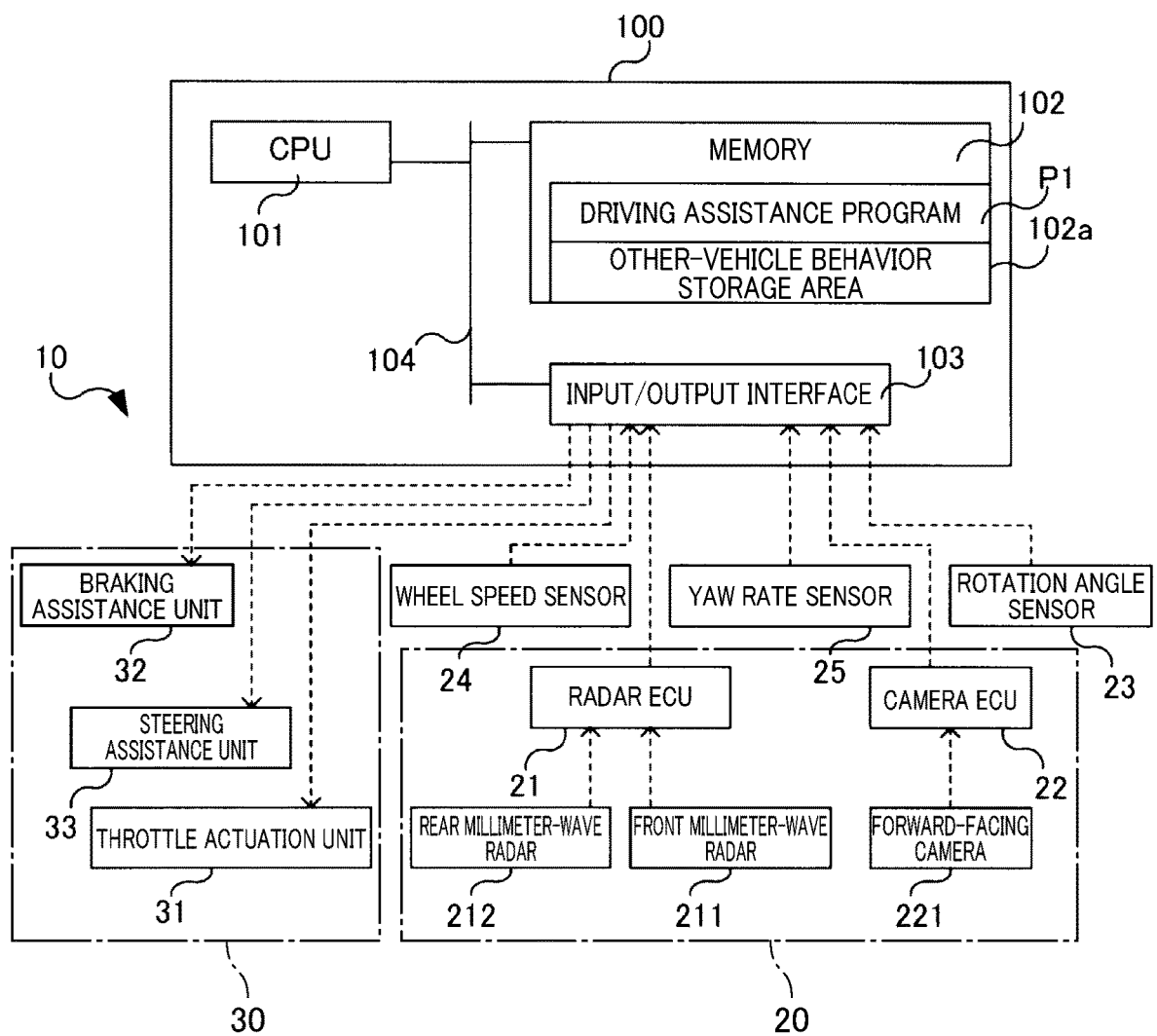
FIG. 2 is a functional block diagram of the travel control apparatus, a target detector, and a vehicle control executor of the first embodiment.

As shown in FIG. 2, the travel control apparatus 100 includes a central processing unit (CPU) 101 as a controller, a memory 102, an input/output interface 103 as an information acquirer, and a bus 104. The CPU 101, the memory 102, and the input/output interface 103 are bidirectionally communicably connected to each other via the bus. The memory 102 includes a non-volatile read-only memory, such as ROM, storing a driving assistance program P1 for performing driving assistance including changing the settings of the driving state of the own vehicle, a memory readable and writable by the CPU 101, such as RAM. The memory 102 further includes an other-vehicle behavior storage area 102a for storing amounts of lateral movement of other vehicles acquired when the own vehicle is traveling or at a stop before the driving state is changed. The CPU 101 reads the driving assistance program P1 stored in the memory 102 to deploy it in the readable and writable memory. The CPU 101 may be a single CPU or a plurality of CPUs for executing respective programs, or may be a multi-core CPU capable of simultaneously executing a plurality of programs.

The input/output interface 103 is connected to the radar ECU 21, the camera ECU 22, the rotation angle sensor 23, the wheel speed sensor 24 and the yaw rate sensor 25, the throttle actuation unit 31, the braking assistance unit 32, and the steering assistance unit 33 via respective control signal lines. Detection signals are input to the input/output interface 103 from the radar ECU 21, the camera ECU 22, rotation angle sensor 23, the wheel speed sensor 24, the yaw rate sensor 25. The input/output interface 103 outputs to the throttle actuation unit 31 a control signal indicating the degree of openness of a throttle valve, outputs to the braking assistance unit 32 a control signal indicating a braking level, and outputs to the steering assistance unit 33 a control signal indicating a steering angle. The input/output interface 103 serves as an information acquirer to acquire information regarding targets around the own vehicle detected by various sensors. The throttle actuation unit 31, the braking assistance unit 32, and the steering assistance unit 33 serve as a vehicle control executor.

The millimeter-wave radars 211, 212 are configured to emit millimeter waves and receive reflected waves from targets to detect a distance, a relative speed, and an angle of each of the targets. In the present embodiment, the front millimeter-wave radars 211 are disposed at the center and both sides of the front bumper 520. The rear millimeter-wave radars 212 are disposed at both sides of the rear bumper 521. Each front millimeter-wave radar 211 detects targets in front of the own vehicle, such as a front vehicle, an oblique front vehicle, an oncoming vehicle, and a front person. Each rear millimeter-wave radar 212 detects targets rearward the own vehicle, such as a rear vehicle, an oblique rear vehicle and the like. The detection signals output from the millimeter-wave radar 211, 212 are processed in the radar ECU 21, and a detection signal indicating a single or a plurality of points or a sequence of points representing a representative location of a target is input to the input to the travel control apparatus 100. In an alternative embodiment where the radar ECU 21 is not installed detection signals indicating unprocessed received waves may be input from the millimeter-wave radars 211, 212 to the travel control apparatus 100. When the unprocessed received waves are used as detection signals, the travel control apparatus 100 may perform signal processing to determine locations and distances of targets.

The forward-facing camera 221 is an imager including one imaging element, such as a charge-coupled device (CCD) or the like, configured to receive visible light and then output outline information regarding objects as image data that is a detection result. The camera ECU 22 performs feature point extraction processing on the image data output from the forward-facing camera 221 and compare a pattern of the extracted feature points and a prepared comparison pattern representing an outline of an object to be identified, such as a vehicle. If the extracted pattern and the comparison pattern match each other or are similar to each other, the camera ECU 22 generates frame images including the object. If the extracted pattern and the comparison pattern do not match each other or are not similar to each other, the camera ECU 22 generates no frame images. In a case where image data includes a plurality of objects, the camera ECU 22 generates a plurality of frame images including the plurality of identified objects, and inputs them as detection signals to the travel control apparatus 100. Each frame image is represented by pixel data and includes location information, that is, coordinate information, of the identified objects. The number of frame images that can be included in the detection signal depends on a bandwidth between the camera ECU 22 and the travel control apparatus 100. In an alternative embodiment where the camera ECU 22 is not installed, a detection signal representing unprocessed image data captured by the forward-facing camera 221 may be input to the travel control apparatus 100, where the travel control apparatus 100 may identify targets using outline patterns of objects to be identified. In the present embodiment, the forward-facing camera 221 is disposed at the upper center of the front windshield 510. The pixel data output from the forward-facing camera 221 may be monochrome or color image data. In a case where objects other than vehicles are to be identified, outline patterns of desired objects are prepared and the camera ECU 22 may output frame images including the desired objects as a detection signal. In such a case, appropriate frame images may selectively be used in subsequent processing performed by the travel control apparatus 100.

The rotation angle sensor 23 is configured to detect an amount of torsion experienced by the steering rod during steering of the steering wheel 504, that is, a steering torque, thereby detecting a steering angle of the steering wheel 504. In the present embodiment, the rotation angle sensor 23 is provided along the steering rod connecting the steering wheel 504 and the steering mechanism. The rotation angle sensor 23 outputs a detection signal whose voltage value is proportional to the amount of torsion.

The wheel speed sensor 24 provided on each wheel 501 is configured to detect a rotational speed of the wheel 501. The wheel speed sensor 24 outputs a detection signal whose voltage value is proportional to the wheel speed of the wheel 501 or outputs a pulse wave whose pulse interval is proportional to the wheel speed of the wheel 501. Information regarding a vehicle speed, a travel distance and the like can be acquired using the detection signal from the wheel speed sensor 24.

The yaw rate sensor 25 is configured to detect a rotation angle speed of the vehicle 500. The yaw rate sensor 25 may be disposed in the center of the vehicle 500. The yaw rate sensor 25 outputs a detection signal whose voltage value is proportional to a rotational direction and an angular speed.

The throttle actuation unit 31 is an actuator, such as a step motor, configured to adjust the degree of openness of the throttle valve in response to accelerator pedal actuation by the driver of the own vehicle or independently of accelerator pedal actuation by the driver of the own vehicle and thereby control outputs of the internal-combustion engine ICE. The throttle actuation unit 31 incorporates a driver to control operations of the actuator based on the control signal from the CPU 101. In the present embodiment, the throttle actuation unit 31 is provided along the inlet manifold to increase or decrease the air intake to the internal-combustion engine ICE in response to the control signal from the travel control apparatus 100.

The braking assistance unit 32 is an actuator configured to implement braking by the braking devices 502 independently of brake pedal actuation by the driver of the own vehicle. The braking assistance unit 32 incorporates a driver configured to, based on the control signal from the CPU 101, control operations of the actuator. In the present embodiment, the braking assistance unit 32 is provided on the brake lines 503 to increase or decrease a hydraulic pressure within the brake lines 503 in accordance with the control signal from the travel control apparatus 100 and thereby achieve brake assistance and a decrease in the vehicle speed in response to the detection results of the forward-facing camera 221 and the millimeter-wave radars 211, 212. The braking assistance unit 32 includes a module formed of an electric motor and a hydraulic pressure piston actuated by the electric motor. In an alternative embodiment, the braking assistance unit 32 may use a brake control actuator inherently incorporated in the control light electronic stability control (ESC) or the anti-lock braking device. The braking assistance unit 32 is included in the vehicle control executor 30 configured to perform brake assistance, automatic braking, or a slowing down of the vehicle speed.

The steering assistance unit 33 is an actuator configured to implement steering by the steering device 42 independently of operations of the steering wheel 504 by the driver of the own vehicle. The steering assistance unit 33 incorporates a driver configured to, based on the control signal indicating a steering angle from the CPU 101, control operations of the actuator. In the present embodiment, the steering assistance unit 33 is provided along the turn shaft 44 to drive the turn shaft 44 in a left or right direction in accordance with the control signal from the travel control apparatus 100 and thus change the turning angle of the forward wheels 501, thereby achieve steering assistance in response to the detection results of the forward-facing camera 221 and the millimeter-wave radars 211, 212. The steering assistance unit 33 includes a module formed of an electric motor and a pinion gear driven by the electric motor, such that the turn shaft 44 is driven by the pinion gear driving the rack gear provided along the turn shaft 44. The steering assistance unit 33 may also be used as a steering force assistance device that assists a steering force input from the steering wheel 504. The steering assistance unit 33 may include a motor provided along the turn shaft 44. The steering assistance unit 33 is included in the vehicle control executor 30 configured to perform driving assistance or automatic driving accompanied by changes in the steering angle.

Figure 3:
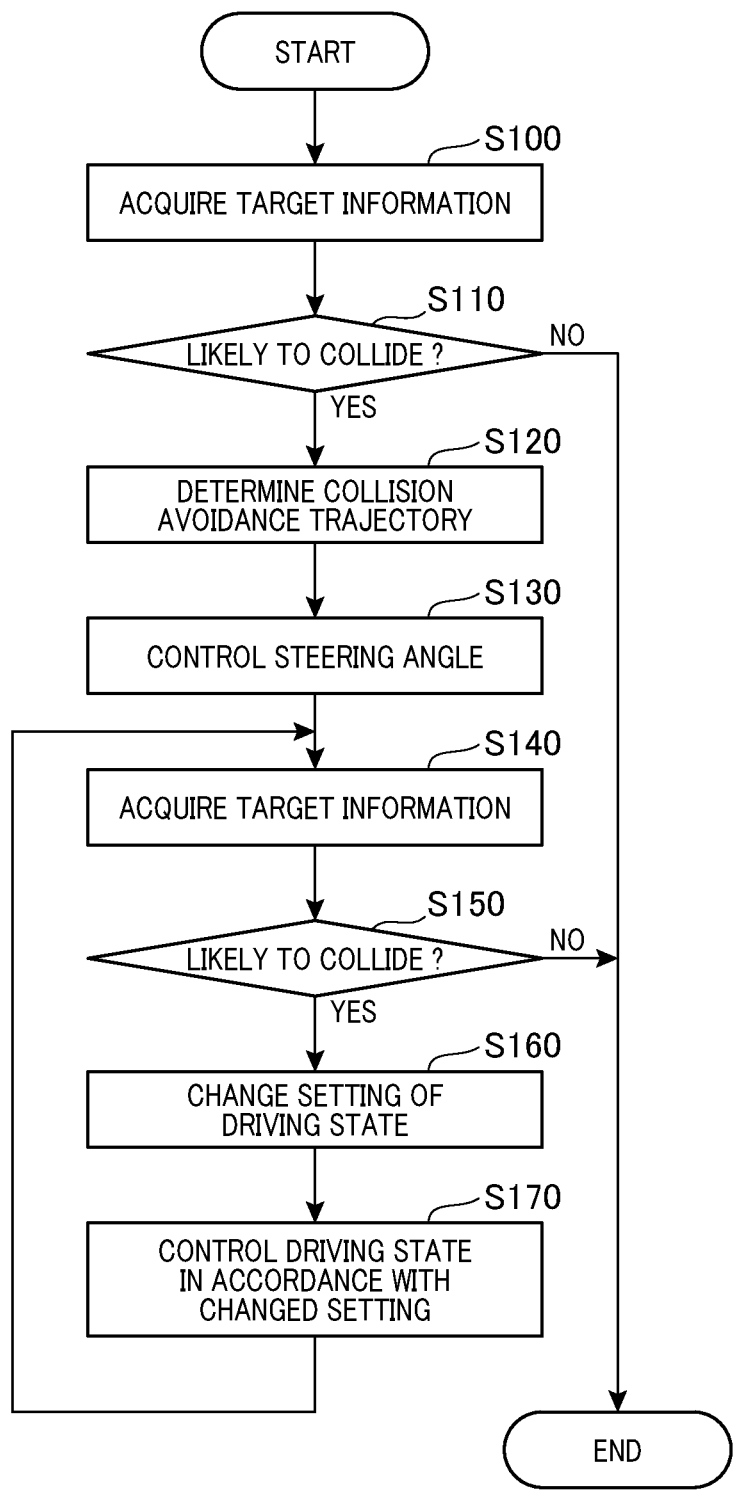
FIG. 3 is a flowchart of driving assistance control processing performed by the travel control apparatus of the first embodiment.

Driving assistance processing performed by the travel control apparatus 100 of the first embodiment will now be described with reference to FIG. 3. This driving assistance processing is performed every predetermined time interval during start up and shut down, that is, from the time of turning on to the time of turning off a start switch. The CPU 101 executes a driving assistance program P1 to perform driving assistance processing shown in FIG. 3. The driving assistance processing of the present embodiment includes, for example, vehicle speed assistance processing, brake assistance processing, and steering assistance processing. The vehicle speed assistance processing includes acceleration and deceleration of the vehicle speed. The brake assistance processing includes rapid braking and slow braking for collision avoidance between the own vehicle and an object. The steering assistance processing includes steering for collision avoidance between the own vehicle and an object and steering for lane departure avoidance.

At step S100, the CPU 101 acquires target information that is information regarding targets around the own vehicle via the input/output interface 103 from the radar ECU 21 and the camera ECU 22. The targets may include vehicles, persons, on-road structures, such traffic lights and traffic signs, and on-road markings, such as lane markings. At least one of the targets, for which the own vehicle is to be controlled, may also be referred to as an object. The CPU 101 performs data fusion processing for increasing the accuracy of identifying the object using detection signals acquired from the radar ECU 21 and detection signals acquired from the camera ECU 22. That is, data unification processing or data joint processing is performed. More specifically, the CPU 101 associates location coordinates of each reflection point representing a target from the radar ECU 21 with a detection signal from the camera ECU 22, that is, location coordinates of an object whose type has been determined via the pattern matching, among targets included in an image frame. In the present embodiment, a front vehicle located ahead of the own vehicle, an oncoming vehicle located ahead of the own vehicle, a person located ahead of the own vehicle, a rear vehicle located rearward of the own vehicle, an on-road marking, an on-road structure or the like may be determined as an object. There may be a plurality of targets. In particular, when a plurality of targets are located ahead of the own vehicle, the detection signals received from the radar ECU 21 and the camera ECU 22 may include a plurality of objects. Accordingly, data fusion processing needs to be performed on each object.

At step S110, the CPU 101, using the target information acquired at step S100, determines whether or not an object located on a roadway ahead of the own vehicle, for example, a stationary or parked front vehicle is likely to collide with the own vehicle. More specifically, the CPU 101 determines whether or not there is an overlapping range between a horizontal coordinate range corresponding to a width of the own vehicle and a horizontal coordinate range corresponding to a width of the front vehicle acquired from the target information. The width of the front vehicle is a horizontal length of the own vehicle as viewed from the own vehicle. In a case where the stationary front vehicle is parked at an angle with respect the own vehicle, the width of the front vehicle may correspond to a distance between the left rear end and the right front end of the front vehicle. If there is an overlapping range between the horizontal coordinate range corresponding to the width of the own vehicle and the horizontal coordinate range corresponding to the width of the front vehicle, the CPU 101 determines that the own vehicle is likely to collide with the front vehicle. If there is no overlapping range, the CPU 101 determines that the own vehicle is not likely to collide with the front vehicle. In addition to the horizontal coordinate range, the vertical coordinate range may also be used. In such an alternative embodiment, if the CPU 101 determines that there is a two-dimensional overlapping range between a two-dimensional coordinate range corresponding to a projected area of the own vehicle onto a front projection plane and a two-dimensional coordinate range corresponding to the front vehicle, the CPU 101 may determine that the own vehicle is likely to collide with the front vehicle.

If at step S110 the CPU 101 determines that there is no possibility of collision, there is no need to perform driving assistance by steering assistance. The process flow then ends. If at step S110 the CPU 101 determines that the own vehicle is likely to collide with the front vehicle ("Yes" branch of step S110), then at step S120 the CPU 101 determines a collision avoidance trajectory. More specifically, collision avoidance processing intended to avoid a collision between the front vehicle and the own vehicle or reduce damage to the own vehicle caused by a collision is performed to determine a steering angle for providing a collision avoidance trajectory that does not cross the centerline. In the present embodiment, after performing collision avoidance processing to avoid a collision with the front vehicle via steering assistance, the CPU 101 continues controlling the steering angle to make a travel direction of the own vehicle parallel with the centerline or lanes, and return the own vehicle to the planned travel lane. This can prevent the own vehicle from continuing to travel in the oncoming lane or contacting with a roadside object along the oncoming lane. That is, a vehicle behavior similar to a collision avoidance action that a driver of the own vehicle would take to avoid an obstacle ahead of the own vehicle may be implemented.

At step S130, the CPU 101 outputs a steering angle control signal that indicates the determined steering angle via the input/output interface 103 to the steering assistance unit 33, thereby controlling the steering angle. The steering assistance unit 33 changes the steering angle in response to the received steering angle control signal. Thus, the course of the own vehicle, that is, the travel direction of the own vehicle is changed so as to avoid a collision with the front vehicle.

At step S140, the CPU 101 acquires target information, and after the steering assistance, determines whether or not the own vehicle is likely to collide with other vehicles including the front vehicle or a person at step S150. The other vehicles may include an oncoming vehicle different from the front vehicle, and a rear vehicle following the own vehicle. The vehicles may include a two-wheeled vehicle and a three-wheeled vehicle. In the following, a person is also referred to as "another vehicle." If at step S150 the CPU 101 determines that the own vehicle is likely to collide with another vehicle, the CPU 101 changes the setting of the driving state of the own vehicle at step S160. Driving states may include a speed, a steering angle, a traveling state, a stationary state of the own vehicle. Changes in the setting of the driving state of the own vehicle may include at least one of an increase in the vehicle speed, a decrease in the vehicle speed, a change in the steering angle, and a braking decision. A determination as to which driving state is to be changed in its setting is made in response to aspects of the possibility of collision between the own vehicle and another vehicle. These aspects will be described later. At step S170, the CPU 101 transmits the changed setting of the driving state as a control signal to the throttle actuation unit 31, the braking assistance unit 32, and the steering assistance unit 33 in response to a type of the set driving state, thereby controlling the driving state. Thereafter, the process flow proceeds to step S140. When the travel control system 10 is not only able to set a driving state, but also able to implement the set driving state, the expression "changing the driving state" may be used in place of the expression "changing the setting of the driving state".

At step S150, if the CPU 101 determines that the own vehicle is unlikely to collide with another vehicle, then the process flow ends. That is, the CPU 101 repeatedly performs S140-S170 until determining that the own vehicle is unlikely to collide with another vehicle, thereby continuing to avoid or reduce a contact between the own vehicle and another vehicle.

If there is no possibility of collision between the own vehicle and another vehicle ("No" branch of step S150), the process flow of the present cycle ends. Processing of steps S100-S130 may be performed by another driving assistance program unable to change the settings of the driving states being executed, the driving assistance program P1 of the first embodiment may be configured to execute at least steps S140-S170.

FIGS. 4 to 8 illustrate some examples where the setting of the driving state of the own vehicle is changed if travel of the own vehicle is continued in accordance with a collision avoidance trajectory determined to avoid a collision between the own vehicle and the front vehicle that is stationary on a roadway ahead of the own vehicle, thereby again avoiding a collision between the own vehicle and the front vehicle or another vehicle.

Figure 4:
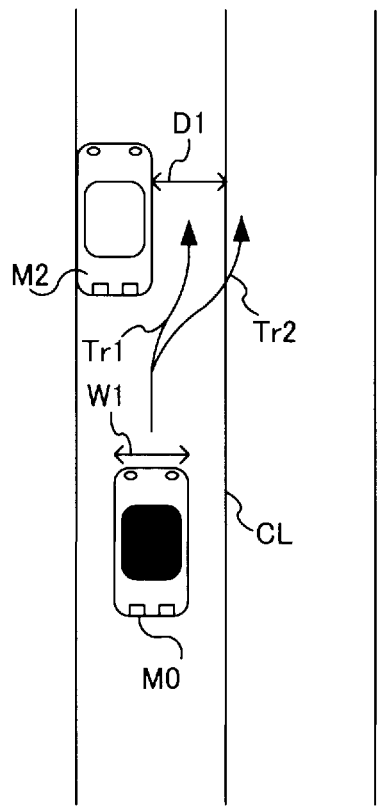
FIG. 4 is a first example of a change in the driving state of the own vehicle made to avoid a collision with a front vehicle after taking an action to avoid a collision with the front vehicle.

In a first example shown in FIG. 4, to avoid a collision between the own vehicle M0 and the front vehicle M2, the steering angle determined as a driving state at step S120 is changed to avoid a collision between the own vehicle and the front vehicle M2. In FIG. 4, D1 represents a distance in meters between the front vehicle M2 and the centerline CL, W1 represents a width in meters of the own vehicle M0, and Tr1 represents a collision avoidance trajectory implemented by a steering angle determined at step S120 to avoid a collision between the own vehicle and the front vehicle. The collision avoidance trajectory Tr1 is set so as not to cross the centerline CL. In the present embodiment, if at step S150 it is determined that the own vehicle is likely to collide with the front vehicle M2 since D1≤W1, then at step S160 the steering angle determined at step S120 is changed, thereby providing a collision avoidance trajectory Tr2 that crosses the centerline CL to avoid a collision between the own vehicle and the front vehicle M2. If at step S150 it is determined that the own vehicle is unlikely to collide with the front vehicle M2 since D1>W1, then the process flow ends. That is, in such a case, it is determined that the own vehicle is allowed to pass the front vehicle without crossing the centerline CL, and the steering assistance processing using a steering angle determined at step S120 is performed. Thus, the collision avoidance trajectory Tr1 can prevent a collision between the own vehicle and the front vehicle M2.

Figure 5:
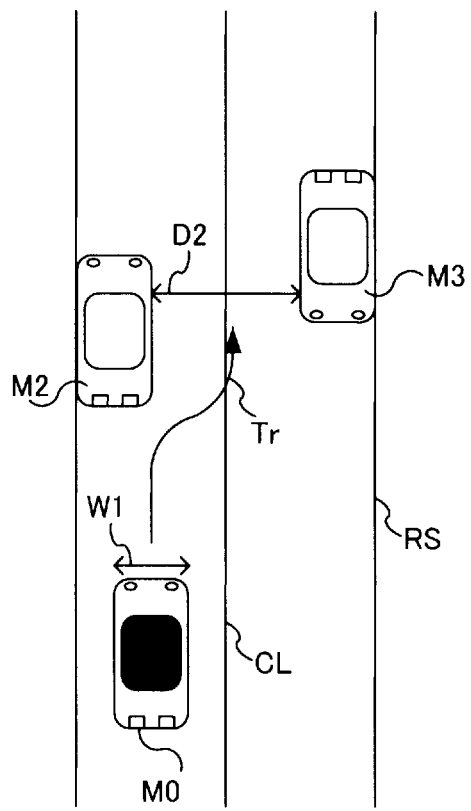
FIG. 5 is a second example of a change in the driving state of the own vehicle made to avoid a collision with a front vehicle or an oncoming vehicle after taking an action to avoid a collision with the front vehicle.

In a second example shown in FIG. 5, where there are the front vehicle M2 and a stationary oncoming vehicle M3 as another object, the setting of the driving state is changed to avoid collisions with the front vehicle M2 and the oncoming vehicle M3 after taking an action to avoid the front vehicle M2. In FIG. 5, D2 represents a distance in meters between the front vehicle M2 and the oncoming vehicle M3. In the example of FIG. 5, if it is determined at step S150 that the own vehicle is likely to collide with the front vehicle M2 and the oncoming vehicle M3 and it is further determined that D2>W1, the steering angle determined at step S120 is changed to achieve the driving state in accordance with a collision avoidance trajectory Tr2 that crosses the centerline CL. If it is determined at step S150 that the own vehicle is likely to collide with the front vehicle M2 and the oncoming vehicle M3 and it is further determined that D2≤W1, the setting of the steering angle determined at step S120 is not changed, but the setting of the vehicle state is changed by determining to brake the own vehicle M0 or reducing the speed of the own vehicle M0. Upon receipt of a control signal from the travel control apparatus 100, the braking assistance unit 32 performs braking such that the own vehicle M0 is stopped or decelerated, thereby avoiding collisions with the front vehicle M2 and the oncoming vehicle M3 or reducing damage caused by collisions with the front vehicle M2 and the oncoming vehicle M3. If it is determined at step S150 that the own vehicle is unlikely to collide with the front vehicle M2 and the oncoming vehicle M3, steering assistance processing based on the steering angle determined at step S120 is performed without changing the setting of the driving state of the own vehicle. This example may be applied to a case where there is no oncoming vehicle M3. This example may also be applied to a case where the road has no centerline CL, where the distance D2 may be a distance between the front vehicle M2 and the road side RS located furthermost from the own vehicle M0.

Figure 6:
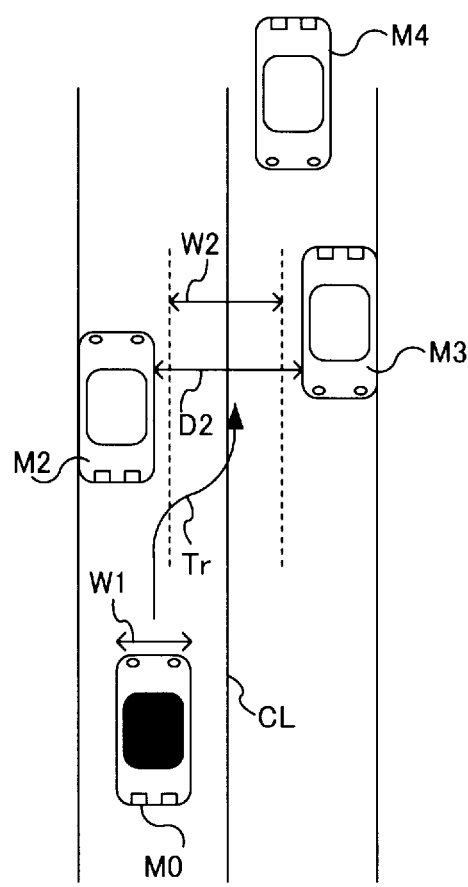
FIG. 6 is a third example of a change in the driving state of the own vehicle made to avoid a collision with a front vehicle or an oncoming vehicle after taking an action to avoid a collision with the front vehicle.

In a third example shown in FIG. 6, where there are the front vehicle M2 and a stationary oncoming vehicle M3 and a traveling oncoming vehicle M4 as other objects, the setting of the driving state is changed to avoid collisions with the front vehicle M2 and the oncoming vehicles M3 and M4 after taking an action to avoid the front vehicle M2. In FIG. 6, D2 represents a distance in meters between the front vehicle M2 and the oncoming vehicle M3 in the widthwise direction of the own vehicle M0, and W2 represents a potential driving width in meters of the oncoming vehicle M4. The driving width W2 may be set to a width measurement of the identified target (M4) plus a predetermined margin.

In the example of FIG. 6, if at step S150 it is determined that D2>W2, the oncoming vehicle M4 is likely to travel between the front vehicle M2 and the oncoming vehicle M3, that is, the oncoming vehicle M4 is likely to enter a passing zone, and thus it is determined that the own vehicle M0 avoiding the front vehicle M2 is likely to collide with the oncoming vehicle M4. In such a case, the travel control apparatus 100 changes the driving state by reducing or increasing the speed of the own vehicle M0 or making a braking decision. For example, when the oncoming vehicle M4 is already in proximity to the oncoming vehicle M3, the travel control apparatus 100 transmits to the braking assistance unit 32 a control signal to cause the braking assistance unit 32 to perform braking and transmits to the throttle actuation unit 31 a control signal to turn the throttle off, thereby reducing the speed of the own vehicle M0 or bringing the own vehicle M0 to a stop before the own vehicle M0 approaching a rear end of the front vehicle M2. Thus, the oncoming vehicle M4 will pass through the passing zone, so that a collision will be avoided between the own vehicle M0 and the oncoming vehicle M4. In a case where the oncoming vehicle M4 is far away from the oncoming vehicle M3 such that the own vehicle can pass through the passing zone earlier than the oncoming vehicle M4, the travel control apparatus 100 transmits to the throttle actuation unit 31 a control signal to increase the degree of openness of the throttle valve, thereby increasing the speed of the own vehicle M0. Thus, the own vehicle M0 will pass through the passing zone earlier than the oncoming vehicle M4, which can avoid a collision between the own vehicle M0 and the oncoming vehicle M4. If at step S150 it is determined that D2≤W2, it is determined that the oncoming vehicle M4 will come to a stop before entering the passing zone. If D2≤W and thus the own vehicle M0 can not enter the passing zone to avoid collisions with the front vehicle M2 and the oncoming vehicle M3, the setting of the driving state is changed by making a decision to brake the own vehicle M0. If D2>W1 and thus the own vehicle M0 can enter the passing zone without colliding with the front vehicle M2 and the oncoming vehicle M3, the travel control apparatus 100, taking into account a possibility of the oncoming vehicle M4 entering the passing zone, change the setting of the driving state by decreasing the speed of the own vehicle M0. The own vehicle M0 is decelerated to enter the passing zone, which can avoid a collision between the own vehicle M0 and the oncoming vehicle M4 that could be caused by the oncoming vehicle M4 entering the passing zone and reduce the damage caused by the collision. When the speed of the own vehicle M0 is decreased or increased, an amount of fuel supply from a fuel supply system (not shown) is also decreased or increased.

Figure 7:
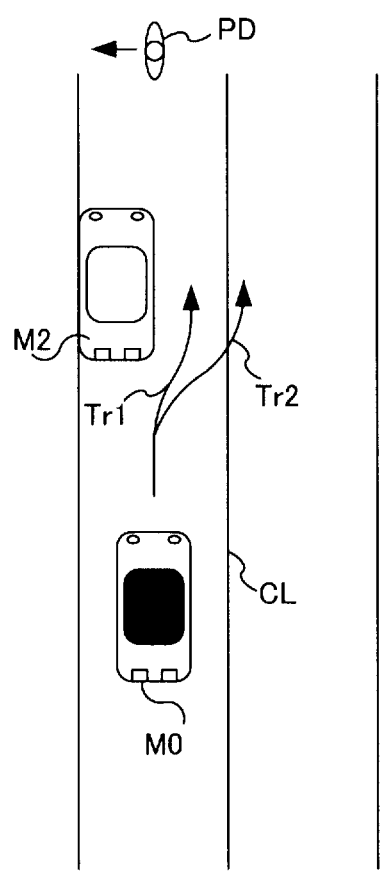
FIG. 7 is a fourth example of a change in the driving state of the own vehicle made to avoid a collision with a pedestrian crossing in front of a front vehicle after taking an action to avoid a collision with the front vehicle.

In a fourth example shown in FIG. 7 where a pedestrian PD is crossing in front of the front vehicle M2, the setting of the driving state of the own vehicle M0 is changed to avoid a contact with the pedestrian PD. More specifically, the steering angle as a driving state determined at step S120 to avoid a collision between the front vehicle M2 and the own vehicle M0 is further changed to increase the accuracy of avoiding a collision between the own vehicle M0 and the pedestrian PD. In FIG. 7, Tr1 represents a collision avoidance trajectory achieved by the steering angle determined at step S120. If a pedestrian PD is detected, the steering angle is changed at step S160 such that the own vehicle moves away from the pedestrian PD, thereby achieving a driving state in accordance with the collision avoidance trajectory Tr2. The setting of the driving state of the own vehicle M0 may also be changed not only in the case where there is a pedestrian PD crossing in front of the front vehicle M2, but also in a case where there is a bicycle crossing in front of the front vehicle M2 or a bicycle coming towards the own vehicle M0.

Figure 8:
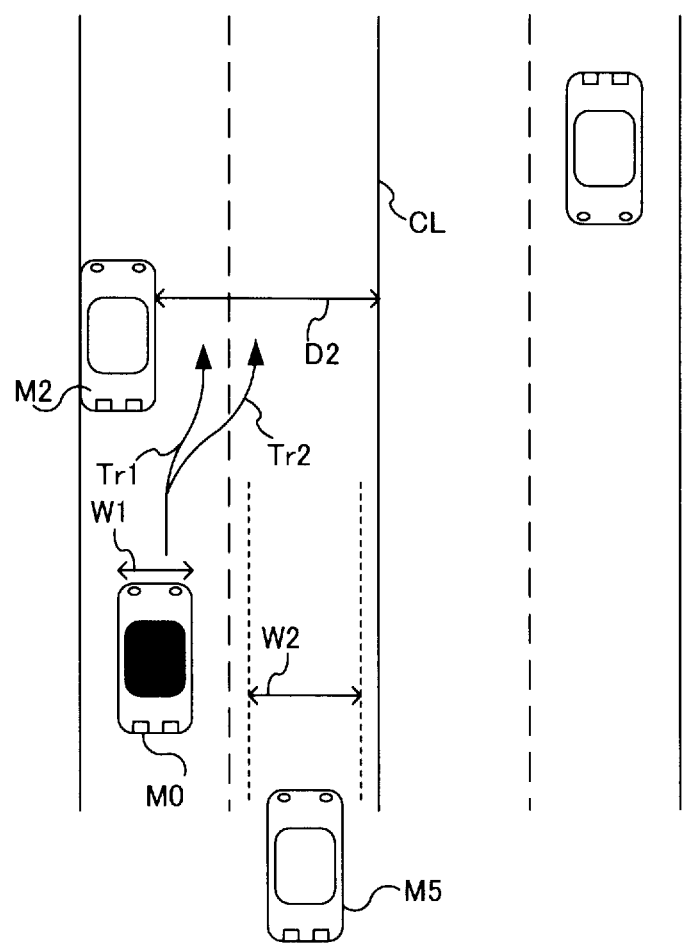
FIG. 8 is a fifth example of a change in the driving state of the own vehicle made to avoid collisions with an oncoming vehicle and a rear vehicle after taking an action to avoid a collision with the front vehicle.

In a fifth example shown in FIG. 8 where there is a rear vehicle M5 as another object that is traveling rearward of the own vehicle M0, the setting of the driving state of the own vehicle M0 is changed to avoid a collision with the rear vehicle M5 after taking an action to avoid the front vehicle M2. In FIG. 8, D2 represents a distance in meters between the front vehicle M2 and the centerline CL, and W2 represents a potential driving width in meters of the rear vehicle M5. The centerline CL is a line dividing bi-directional travel lanes. The driving width W2 may be set to a width measurement of the identified target (M5) plus a predetermined margin.

In the example of FIG. 8, if it is determined at step S150 that D2>W1, the travel control apparatus 100 may determine a collision avoidance trajectory Tr1 or Tr2 as a collision avoidance trajectory unless the own vehicle M0 collides with the front vehicle M2. In the example of FIG. 8, where the rear vehicle M5 is traveling rearward of the own vehicle M0, the setting of the steering angle is changed to achieve the collision avoidance trajectory Tr1 closer to the front vehicle M2, such that the driver of the rear vehicle M5 is not forced to perform braking even if there is no probability of a collision between the own vehicle M0 and the rear vehicle M5. If the own vehicle M0 is likely to collide with the rear vehicle M5, the travel control apparatus 100 determines to change the setting of the driving state by reducing or increasing the speed of the own vehicle M0 or making a braking decision. For example, in a case where the rear vehicle M5 is already in proximity to the own vehicle M0, the travel control apparatus 100 transmits to the braking assistance unit 32 a control signal to cause the braking assistance unit 32 to perform braking and transmits to the throttle actuation unit 31 a control signal to turn the throttle off, thereby reducing the vehicle speed of the own vehicle M0 or bringing the own vehicle M0 to a stop before the own vehicle M0 approaching a rear end of the front vehicle M2. Thus, the rear vehicle M5 is allowed to pass the own vehicle M0, which can avoid a collision between the own vehicle M0 and the rear vehicle M5. In a case where the rear vehicle M5 is away from the own vehicle M0 and the own vehicle M0 can pass the front vehicle M2 earlier than the rear vehicle M5, the travel control apparatus 100 transmits to the throttle actuation unit 31 a control signal to increase the degree of openness of the throttle valve, thereby increasing the speed of the own vehicle M0. Thus, the own vehicle M0 is allowed to pass the front vehicle M2 earlier than the rear vehicle M5, which can avoid a collision between the own vehicle M0 and the rear vehicle M5. This example may be applied to a case where there is no oncoming vehicle M3. This example may also be applied to a case where there is an oncoming vehicle traveling in an oncoming lane without avoiding another vehicle by steering. The setting of the steering angle is changed such that, taking into account the driving width W2 of the oncoming vehicle, the collision avoidance trajectory Tr1 close to the front vehicle M2 is taken.

Figure 9:
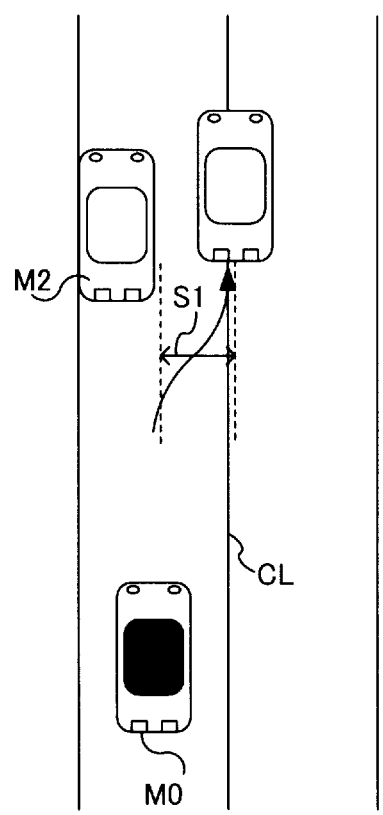
FIG. 9 is an example of learning an amount of lateral movement required to avoid a collision with a front vehicle based on behaviors of other vehicles.

In an example of FIG. 9, a behavior of a preceding vehicle M6, more specifically, an amount of lateral movement made by the preceding vehicle M6 to avoid a collision with the front vehicle M2, that is, a lateral distance S1, is stored in other-vehicle behavior storage area 102*a* of the memory 102. A new collision avoidance trajectory, that is, a steering angle, can be predetermined using the stored lateral distance S1, which allows the setting of the driving state of the own vehicle to be changed at step S160 to avoid a collision with the front vehicle M2. A predetermined collision avoidance trajectory may be used as the collision avoidance trajectory at step S120. To achieve the new collision avoidance trajectory, the speed of the own vehicle may be decreased in response to a distance between the detected front vehicle M2 and the own vehicle M0. An amount of lateral movement made by a traveling oncoming vehicle to avoid a collision with a stationary oncoming vehicle may also be stored in other-vehicle behavior storage area 102*a* of the memory 102. The amount of lateral movement made by the traveling oncoming vehicle stored in the memory 102 may also be used to change the steering angle of the own vehicle M0.

As described above, the travel control apparatus 100 of the first embodiment is configured to, if determining that if travel of the own vehicle is continued in accordance with a collision avoidance trajectory determined to avoid a collision with an object M2 located on a roadway ahead of the own vehicle M0, the own vehicle M0 is likely to collide with the object M2 or another object M3-M5, then change the setting of the driving state of the own vehicle M0 to avoid or reduce a likelihood of the collision. Thus, this configuration can avoid or reduce the likelihood of a collision with the object M2 or another object M3-M5 that may occur after steering assistance actions. Such a likelihood of the collision has not been considered in the conventional steering assistance.

Changing the setting of the driving state of the own vehicle M0 to avoid the likelihood of collisions may include changing the steering angle, changing the vehicle speed, that is, acceleration or deceleration, and performing braking. Therefore, the likelihood of collisions with the object M2 and other objects M3-M5 can be avoided or reduced, which can not be achieved only by a steering angle decision to avoid the object M2.

Modifications (1) In the above embodiment, the driving width W2 for each of the oncoming vehicle M4 and the rear vehicle M5 is set to a width of an identified target plus a margin. In an alternative embodiment, the driving width W2 may be set to a total width of targets that is a sum of widths of n targets (n being a positive integer), that is, $W2=\Sigma_{k=1}^{n} W2_k$ in a widthwise direction of a road at a location of the front vehicle M2. Such W2 may be used to determine whether or not the own vehicle M0 can pass through the width W2 or whether or not the oncoming vehicle M4 or the rear vehicle M5 can pass through the width W2. In such an embodiment, not only influence of the presence of the oncoming vehicle M4 and the rear vehicle M5, but also influence of the presence of other targets are taken into account, which can increase the accuracy of avoiding or reducing the likelihood of collisions with the object M2 or other objects M3 to M5. A maximum total width of targets W2 may be determined in a road section from the own vehicle M0 to the oncoming vehicle M4 or the rear vehicle M5 to be used as a representative value. In such an embodiment, the collision likelihood may be determined using the maximum total width of targets W2, which can simplify the determination. From constructional aspects of roads, a width of a road shoulder where vehicles are not assumed to travel or a width of a roadside where vehicles can not travel may be deemed as being an unavailable width. Thus, such a width may be subtracted from the width defined as above.

(2) In an alternative embodiment where a planned driving route of the oncoming vehicle M4 or the rear vehicle M5 can be estimated, a driving width W2' that is the driving width W2 defined as above minus the margin may be used. In such an embodiment, a range within which the setting of the driving state of the own vehicle M0 can be changed may be widened, which can avoid or reduce the likelihood of collisions with the object M2 and other objects M3-M5 while causing the driver of the own vehicle M0 and other occupants to feel less discomfort.

(3) In the above embodiment, at step S120, the collision avoidance trajectory, that is, the steering angle, is determined so as not to cross the centerline of the road. The steering angle may be determined using the horizontal coordinate range corresponding to the width of the front vehicle and the coordinate range in the width-wise direction of the own vehicle while permitting the collision avoidance trajectory to cross the centerline, such that one of lateral edges of the front vehicle, closer to the own vehicle, and one of lateral edges of the own vehicle, closer to the front vehicle, are separated by a predetermined distance. More specifically, in the case of left-hand traffic, the steering angle may be determined such that the left front end of the own vehicle and the right rear end of the front vehicle are separated by a predetermined distance. In the case of right-hand traffic, the steering angle may be determined such that the right front end of the own vehicle and the left rear end of the front vehicle are separated by a predetermined distance. To determine the steering angle, for example, the steering angle predetermined in response to a relative speed between the own vehicle and the front vehicle and the overlapping range (or an overlapping distance) between the own vehicle and the front vehicle is selected. Alternatively, the steering angle may be selected in response to a time until collision (TTC). Such a configuration can increase the possibility of collision avoidance with the front vehicle by steering assistance.

(4) In the above embodiment, at step S120, only the steering assistance is determined to avoid a collision with the front vehicle. In an alternative embodiment, in addition to determining the steering assistance, the speed of the own vehicle may also be reduced. In such an embodiment, the likelihood of a collision with the front vehicle can further be reduced or avoided.

(5) In the above embodiment, steering assistance, braking assistance, acceleration and deceleration of the vehicle speed are performed as driving assistance. In an alternative embodiment, a warning may be provided prior to changing the setting of the driving state of the own vehicle. In such an embodiment, the driver of the own vehicle M0 may beforehand be notified of execution of driving assistance, which can reduce or eliminate own-vehicle driver's discomfort caused by the driving assistance being executed independent of driver's own maneuvers.

(6) In the above embodiment, the travel control apparatus 100 is implemented by software such that the setting of the driving state of the own vehicle is s changed by the CPU 101 executing the driving assistance program P1. In an alternative embodiment, the travel control apparatus 100 may be implemented by hardware, such as preprogramed integrated circuits or the discrete circuits.

The functions of a single component may be distributed to a plurality of components, or the functions of a plurality of components may be integrated into a single component. At least part of the configuration of the above embodiments may be replaced with a known configuration having a similar function. At least part of the configuration of the above embodiments may be removed. At least part of the configuration of one of the above embodiments may be replaced with or added to the configuration of another one of the above embodiments. While only certain features of the invention have been illustrated and described herein, many modifications and changes will occur to those skilled in the art. It is, therefore, to be understood that the appended claims are intended to cover all such modifications and changes as falling within the true spirit of the invention.

What is claimed is:

1. An apparatus for controlling travel of an own vehicle, the own vehicle being a vehicle carrying the apparatus, the apparatus comprising:

an information acquirer configured to acquire target information regarding a target around the own vehicle from a target detector; and a controller configured to, if determining, using the target information acquired by the information acquirer, that if travel of the own vehicle is continued in accordance with a collision avoidance trajectory determined to avoid a collision with an object located on a roadway ahead of the own vehicle, the own vehicle is likely to collide with the object or an other object, change a setting of a driving state of the own vehicle so as to avoid or reduce a likelihood of the collision, wherein the controller is configured to change the setting of the driving state of the own vehicle by making at least one of a change in speed of the own vehicle, a change in a steering angle of the own vehicle, and a decision of braking the own vehicle, for a state in which the object is a front vehicle located on a roadway ahead of the own vehicle and the other object is an oncoming vehicle located in an oncoming lane relative to the owe vehicle, the controller is configured to, using a width of the own vehicle and a distance between the front vehicle and the oncoming vehicle in a width-wise direction of the own vehicle, change the steering angle of the own vehicle to avoid a collision with the oncoming vehicle or the front vehicle, and the controller is configured to store an amount of lateral movement made by a preceding vehicle to avoid a collision with the front vehicle or an amount of lateral movement made by a traveling oncoming vehicle to avoid a collision with the oncoming vehicle, and determine the steering angle of the own vehicle using the stored amount of lateral movement made by the preceding vehicle or the traveling oncoming vehicle in addition to the width of the own vehicle and the distance between the front vehicle and the oncoming vehicle in the width-wise direction of the own vehicle.

2. The apparatus according to claim 1, wherein the controller is further configured to, if the own vehicle is likely to collide with the oncoming vehicle or the front vehicle, make a decision of braking the own vehicle or decrease the speed of the own vehicle to thereby change the speed of the own vehicle.

3. The apparatus according to claim 1, wherein for a state in which the oncoming vehicle is a first oncoming vehicle,
the controller is further configured to, if the own vehicle is likely to collide with a second oncoming vehicle other than the first oncoming vehicle that is capable of traveling between the own vehicle and the first oncoming vehicle, make one of a decision of braking the own vehicle, a decision of decreasing the speed of the own vehicle, and a decision of increasing the speed of the own vehicle to thereby change the setting of the driving state of the own vehicle.

4. The apparatus according to claim 1, wherein for a state in which the object is a front vehicle located on a roadway ahead of the own vehicle and the other object is a rear vehicle located on the roadway rearward of the own vehicle,
the controller is configured to, using a width of the own vehicle, a distance between the front vehicle and a line dividing bi-directional travel lanes in the width-wise direction of the own vehicle, and a predetermined width of the rear vehicle, determine the steering angle of the own vehicle to avoid a collision with the rear vehicle.

5. The apparatus according to claim 4, wherein the controller is further configured to, if the own vehicle is likely to collide with the rear vehicle, make a decision of braking the own vehicle, or decrease or increase the speed of the own vehicle to thereby change the speed of the own vehicle.

6. The apparatus according to claim 1, wherein the object is a front vehicle located on a roadway ahead of the own vehicle and the other object is a person or a bicycle located in close proximity to the front vehicle, and
the controller is configured to change the steering angle of the own vehicle such that the own vehicle moves away from the person or the bicycle.

7. The apparatus according to claim 1, wherein the controller is further configured to determine the collision avoidance trajectory using the target information acquired by the information acquirer.

8. A system for controlling travel of an own vehicle, the own vehicle being a vehicle carrying the system, the system comprising:
a travel control apparatus comprising:
an information acquirer configured to acquire information regarding a target around the own vehicle from a target detector; and
a controller configured to, if determining, using the target information acquired by the information acquirer, that if travel of the own vehicle is continued in accordance with a collision avoidance trajectory determined to avoid a collision with an object located on a roadway ahead of the own vehicle, the own vehicle is likely to collide with the object or an other object, change a setting of a driving state of the own vehicle so as to avoid or reduce a likelihood of the collision;
the target detector configured to detect a target around the own vehicle and output a detection result to the travel control apparatus; and
a vehicle control executor configured to make at least one of a change in speed of the own vehicle, a change in a steering angle of the own vehicle, and a decision of braking the own vehicle, in response to the setting of the driving state of the own vehicle changed by the controller of the travel control apparatus, wherein
the controller is configured to change the setting of the driving state of the own vehicle by making at least one of a change in speed of the own vehicle, a change in the steering angle of the own vehicle, and a decision of braking the own vehicle, and
for a state in which the object is a from vehicle located on a roadway ahead of the own vehicle and the other object is a rear vehicle located on the roadway rearward of the own vehicle, the controller is configured to, using a width of the owe vehicle, a distance between the front vehicle and a line dividing bi-directional travel lanes in a width-wise direction of the own vehicle, and a predetermined width of the rear vehicle, determine the steering angle of the own vehicle to avoid a collision with the rear vehicle.

9. A method for controlling travel of a vehicle, the method comprising:
acquiring target information regarding a target around the vehicle from a target detector; and
changing a setting of a driving state of the vehicle so as to avoid or reduce a likelihood of a collision with a front object located on a roadway ahead of the vehicle or an other object if it is determined, based on the target information acquired, that if travel of the vehicle is continued in accordance with a collision avoidance trajectory determined to avoid a collision with the front object, the vehicle is likely to collide with the front object or the other object, the setting of the driving state of the vehicle is changed by making at least one of a change in speed of the vehicle, a change in a steering angle of the vehicle, and a decision of braking the vehicle, and
for a state in which the front object is a front vehicle located on a roadway ahead of the vehicle and the object is a rear vehicle located on the roadway rearward of the vehicle, determining the steering angle of the vehicle to avoid a collision with the rear vehicle by using a width of the vehicle, a distance between the front vehicle and a line dividing, bi-directional travel lanes in a width-wise direction of the vehicle, and a predetermined width of the rear vehicle.

10. An apparatus for controlling travel of an own vehicle, the own vehicle being a vehicle carrying the apparatus and an object detector for detecting objects around the own vehicle, the apparatus comprising:
an information acquirer configured to acquire target information regarding objects around the own vehicle from the object detector;
a collision avoidance trajectory determiner configured to determine a collision avoidance trajectory based on information regarding a first object located on a roadway ahead of the own vehicle based on the target information from the information acquirer;
a collision likelihood calculator configured to calculate a value indicating a likelihood of a collision between the own vehicle and a second object along the collision avoidance trajectory; and a controller configured to change a setting of a driving state of the own vehicle so as to avoid or reduce the value indicating the likelihood of the collision with the second object, wherein the controller is configured to change the setting of the driving state of the own vehicle by making at least one of a change in speed of the own vehicle, a change in a steering angle of the own vehicle, and a decision of braking the own vehicle, and for a state in which the object is a front vehicle located on a roadway ahead of the own vehicle and an other object is a rear vehicle located on the roadway rearward of the own vehicle, the controller is configured to, using a width of the own vehicle, a distance between the front vehicle and a line dividing bi-directional travel lanes in a width-wiser direction of the own vehicle, and a predetermined width of the rear vehicle, determine the steering angle of the own vehicle to avoid a collision with the rear vehicle.

11. An apparatus for controlling travel of an own vehicle, the own vehicle being a vehicle carrying the apparatus, the apparatus comprising:

an information acquirer configured to acquire target information regarding a target around the own vehicle from a target detector; and a controller configured to, if determining, using the target information acquired by the information acquirer, that if travel of the own vehicle is continued in accordance with a collision avoidance trajectory determined to avoid a collision with an object located on a roadway ahead of the own vehicle, the own vehicle is likely to collide with the object or an other object, change a setting of a driving state of the own vehicle so as to avoid or reduce a likelihood of the collision, wherein the controller is configured to change the setting of the driving state of the own vehicle by making at least one of a change in speed of the own vehicle, a change in a steering angle of the own vehicle, and a decision of braking the own vehicle, and for a state in which the object is a front vehicle located on a roadway ahead of the own vehicle and the other object is a rear vehicle located on the roadway rearward of the own vehicle, the controller is configured to, using a width of the own vehicle, a distance between the front vehicle and a line dividing bi-directional travel lanes in a width-wise direction of the own vehicle, and a predetermined width of the rear vehicle, determine the steering angle of the own vehicle to avoid a collision with the rear vehicle.

12. The apparatus according to claim 11, wherein for a state in which the object is a front vehicle located on a roadway ahead of the own vehicle and the other object is an oncoming vehicle located in an oncoming lane relative to the own vehicle, the controller is configured to, using a width of the own vehicle and a distance between the front vehicle and the oncoming vehicle in the width-wise direction of the own vehicle, change the steering angle of the own vehicle to avoid a collision with the oncoming vehicle or the front vehicle.

13. The apparatus according to claim 12, wherein the controller is further configured to, if the own vehicle is likely to collide with the oncoming vehicle or the front vehicle, make a decision of braking the own vehicle or decrease the speed of the own vehicle to thereby change the speed of the own vehicle.

14. The apparatus according to claim 12, wherein for a state in which the oncoming vehicle is a first oncoming vehicle, the controller is further configured to, if the own vehicle is likely to collide with a second oncoming vehicle other than the first oncoming vehicle that is capable of traveling between the own vehicle and the first oncoming vehicle, make one of a decision of braking the own vehicle, a decision of decreasing the speed of the own vehicle, and a decision of increasing the speed of the own vehicle to thereby change the setting of the driving state of the own vehicle.

15. The apparatus according to claim 12, wherein the controller is configured to store an amount of lateral movement made by a preceding vehicle to avoid a collision with the front vehicle or an amount of lateral movement made by a traveling oncoming vehicle to avoid a collision with the oncoming vehicle, and determine the steering angle of the own vehicle using the stored amount of lateral movement made by the preceding vehicle or the traveling oncoming vehicle in addition to the width of the own vehicle and the distance between the front vehicle and the oncoming vehicle in the width-wise direction of the own vehicle.

16. The apparatus according to claim 11, wherein the controller is further configured to, if the own vehicle is likely to collide with the rear vehicle, make a decision of braking the own vehicle, or decrease or increase the speed of the own vehicle to thereby change the speed of the own vehicle.

17. The apparatus according to claim 11, wherein for a state in which the object is a front vehicle located on a roadway ahead of the own vehicle and the other object is a person or a bicycle located in close proximity to the front vehicle, the controller is configured to change the steering angle of the own vehicle such that the own vehicle moves away from the person or the bicycle.

18. The apparatus according to claim 11, wherein the controller is further configured to determine the collision avoidance trajectory using the target information acquired by the information acquirer.

* * * * *